United States Patent
Matthews et al.

(10) Patent No.: US 9,535,892 B1
(45) Date of Patent: Jan. 3, 2017

(54) METHOD AND SYSTEM FOR GENERATING UNIQUE CONTENT BASED ON BUSINESS ENTITY INFORMATION RECEIVED FROM A USER

(71) Applicants: Lindsay Gordon Matthews, Palo Alto, CA (US); Beth Wells, Mountain View, CA (US); Parthiv Sangani, Mountain View, CA (US); Craig Lee Zarmer, Mountain View, CA (US)

(72) Inventors: Lindsay Gordon Matthews, Palo Alto, CA (US); Beth Wells, Mountain View, CA (US); Parthiv Sangani, Mountain View, CA (US); Craig Lee Zarmer, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 919 days.

(21) Appl. No.: 13/874,282

(22) Filed: Apr. 30, 2013

(51) Int. Cl.
   *G06F 17/00* (2006.01)
   *G06F 17/21* (2006.01)
   *G06F 17/24* (2006.01)
   *G06F 17/27* (2006.01)
   *G06F 17/30* (2006.01)

(52) U.S. Cl.
   CPC ......... *G06F 17/24* (2013.01); *G06F 17/30389* (2013.01); *G06F 17/30864* (2013.01)

(58) Field of Classification Search
   CPC ............ G06F 17/30; G06F 17/30864; G06F 17/30389; G06F 17/3089; G06F 17/2705; G06F 17/2795; G06F 17/30893
   See application file for complete search history.

(56) References Cited

U.S. PATENT DOCUMENTS

| | | | | |
|---|---|---|---|---|
| 7,962,850 B2 * | 6/2011 | Haynes | ................. | G06Q 10/107 715/256 |
| 8,346,792 B1 * | 1/2013 | Baker | ............... | G06F 17/30389 707/759 |
| 2012/0109792 A1 * | 5/2012 | Eftekhari | ................ | G06F 21/31 715/810 |
| 2012/0173971 A1 * | 7/2012 | Sefton | .................... | G06Q 99/00 715/256 |
| 2012/0297294 A1 * | 11/2012 | Scott | ..................... | G06F 17/273 715/261 |
| 2014/0101544 A1 * | 4/2014 | Albrecht | ............... | G06F 17/278 715/273 |

* cited by examiner

Primary Examiner — Ariel Mercado
(74) Attorney, Agent, or Firm — Osha Liang LLP

(57) ABSTRACT

A method is provided for generating unique content using information received from a user. The method includes receiving, from a user, data. The data includes restrictions for content and information associated with a business entity. Further, the method includes analyzing the data to identify a subject matter of the content. The method also includes obtaining a content template that corresponds with the subject matter. The content template comprises a block of text with a plurality of blanks. The method further includes accessing and analyzing a terminology library to identify a required data item. Moreover, the method includes generating search terms based on the required data item, and searching the Internet using the search terms to obtain the required data item. Still yet, the method includes identifying a subset of additional terminology, which is used to generate raw content. Furthermore, the method includes obtaining unique content by modifying the raw content.

16 Claims, 7 Drawing Sheets

METHOD AND SYSTEM FOR GENERATING UNIQUE CONTENT BASED ON BUSINESS ENTITY INFORMATION RECEIVED FROM A USER

BACKGROUND

Most commercial websites include a homepage. The homepage of the website often includes content such as descriptive text that provides detailed information on the business entity that owns the website. This content may include, for example, a description of the business entity, a history of the business entity, awards and accomplishments of the business entity, and information on the industry of the business entity. This content is typically a web user's first introduction to the business entity. Thus having accessible, quality content describing a business entity is commercially important, and generating appropriate, unique content is necessary to establish an online presence.

SUMMARY

In general, in one aspect, the invention relates to a method for generating content. The method includes receiving, from a user, a plurality of data items and comprising a plurality of restrictions of the content and a plurality of information associated with a business entity, analyzing the plurality of data items to identify a subject matter of the content. Based on the analysis, a content template corresponding to the subject matter is obtained, where the content template includes a block of text including a plurality of blanks, and based on the content template, a terminology library, including a plurality of words and phrases associated with the subject matter, is accessed. analyzing the plurality of data items, the content template, and the terminology library to identify a required data item including a plurality of characteristics. The method further includes generating a plurality of search terms corresponding to plurality of characteristics of the required data item, performing an internet search, using the plurality of search terms, to obtain the required data item, and analyzing the plurality of data items and the required data item to identify a plurality of additional terminology, and identifying, based on the content template, a subset of the terminology and a subset of the additional terminology. Finally the method includes combining the plurality of information are combined to generate raw content, and unique content is obtained by modifying the raw content by rearranging text of the content, and a word of the content with a synonym of the word.

In general, in one embodiment, the invention relates to a content generation system. The content generation system includes a computer processor, a data repository including functionality to store a plurality of content templates, where each of the plurality of content templates includes a different block of text including a plurality of blanks, and a plurality of terminology libraries, where each of the plurality of terminology libraries includes a plurality of words and phrases associated with a different subject matter. The content generation system further includes a user interface including functionality to receive, from a user, a plurality of data items including a plurality of restrictions of the content and a plurality of information associated with a business entity and a data acquisition module executing on the computer processor, accessing the data repository. The data acquisition module includes functionality to retrieve, from the data repository and based on an analysis of the plurality of data items, a content template corresponding to the subject matter, where the content template includes a block of text including a plurality of blanks, access, based on the content template, a terminology library stored in the data repository, to obtain a plurality of words and phrases associated with the subject matter, and perform an internet search, using a plurality of search terms generated by the data analysis module, to obtain a required data item. The content generation system further includes a data analysis module executing on the computer processor and including functionality to analyze the plurality of data items, the content template, and the terminology library to identify the required data item, where the required data includes a plurality of characteristics, generate the plurality of search terms corresponding to the plurality of characteristics of the required data item, analyze the plurality of data items and the required data item to identify a plurality of additional terminology, and identify, based on the content template, a subset of the terminology and a subset of the additional terminology. Finally the content generation system includes a content generation module executing on the computer processor and including functionality to combine the content template, the subset of the terminology, the subset of the additional terminology, and the plurality of information to generate raw content, and obtain unique content by modifying the raw content by rearranging text of the content, and a word of the content with a synonym of the word.

In general, in one aspect, the invention relates to a non-transitory computer readable medium comprising executable instructions. The instructions include functionality to receive, from a user, a plurality of data items including a plurality of restrictions of the content and a plurality of information associated with a business entity, and analyze the plurality of data items to identify a subject matter of the content. The instructions further include functionality to obtain, based on the analysis, a content template corresponding to the subject matter, where the content template includes a block of text including a plurality of blanks, access, based on the content template, a terminology library, including a plurality of words and phrases associated with the subject matter, analyze the plurality of data items, the content template, and the terminology library to identify a required data item including a plurality of characteristics, and generate a plurality of search terms corresponding to plurality of characteristics of the required data item. The instructions further include functionality to perform an internet search, using the plurality of search terms, to obtain the required data item, analyze the plurality of data items and the required data item to identify a plurality of additional terminology, and identify, based on the content template, a subset of the terminology and a subset of the additional terminology. Finally, the instruction include functionality to combine the content template, the subset of the terminology, the subset of the additional terminology, and the plurality of information to generate raw content, and obtain unique content by modifying the raw content by rearranging text of the content, and a word of the content with a synonym of the word.

Other aspects and advantages of the invention will be apparent from the following description and the appended claims.

DETAILED DESCRIPTION

Figure 1:
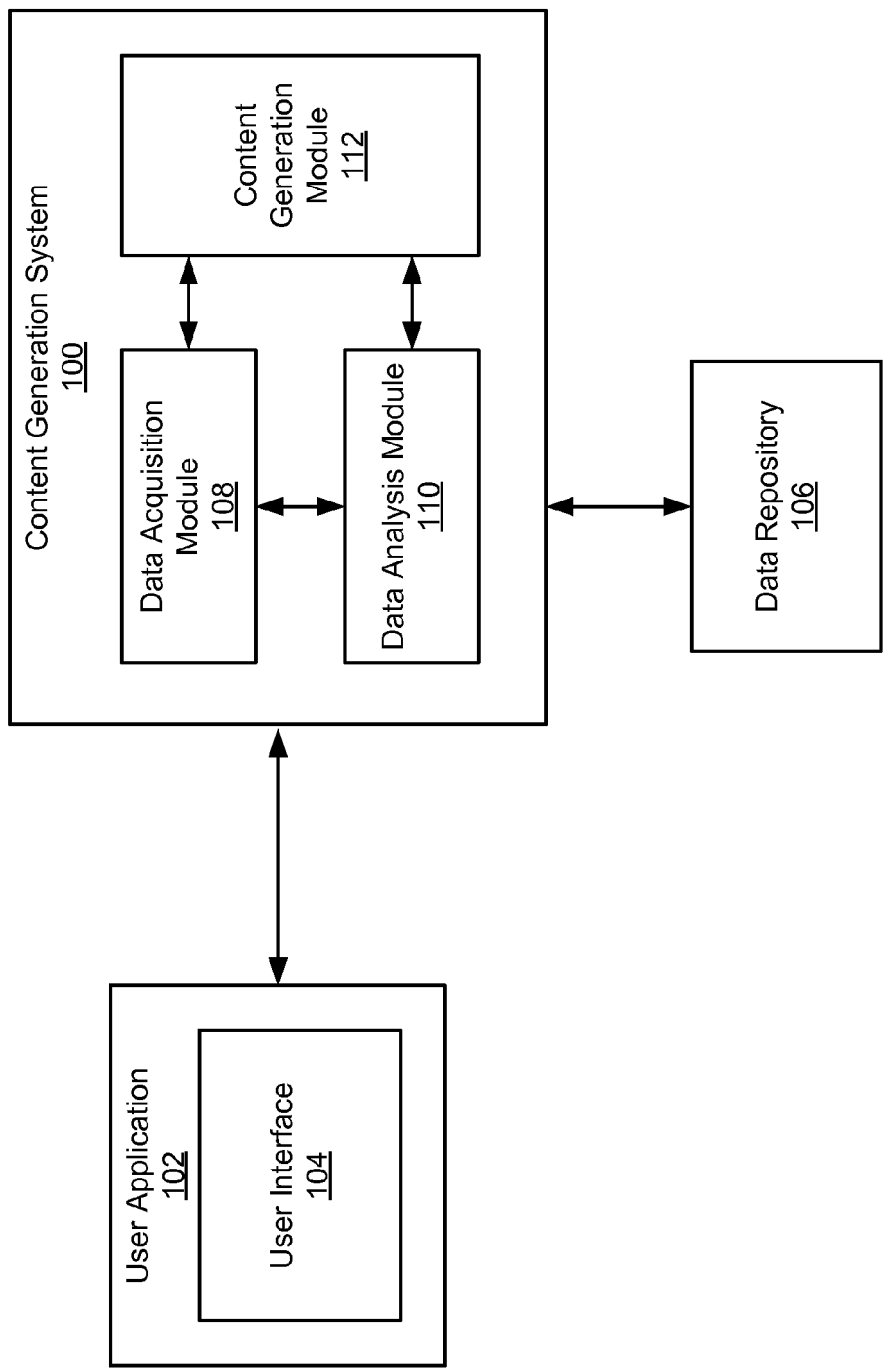
FIG. 1 shows a content generation system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for generating content. Specifically, a business entity uses an automatic content generation system to generate the content, which is a block of text describing a small business. The content may be composed of a number of paragraphs, sentences, and other human-readable linguistic constructs. The text may be displayed on a website, social media, or other informative material of the small business. In one embodiment of the invention, the automatic content generation system obtains data used in the content generation from multiple sources including extant text describing the small business, text describing similar business entities, searches of both the internet and local data repositories for appropriate terminology, and contributions from the user. The data may include base templates, terminology, and a preferred or appropriate tone for the text, as well as user input which specifies preferences, requirements, and approval. After the appropriate data has been collected by the automatic content generation system, the aggregated text and terminology is used to fill out a selected template to create a text block. The text block is then modified (e.g., spun) to create fully customized automatically generated content.

FIG. 1 shows a content generation system (100) in accordance with one embodiment of the invention. The content generation system (100) may include functionality to generate unique content. In one embodiment of the invention, content may refer to text describing details and information about a business entity for display on a website or other promotional material. Alternately, content may include introductory or informative text and may describe non-commercial aspects of another entity, such as a person or a place. The content may be generated from scratch, or it may be a combination of existing text and information obtained from various data sources and directly provided by a user representing the business entity. In one embodiment of the invention, the user may specify parameter and requirements to which the content will generally conform. For example, the user might specify a 'tone' for the content, which might specify how formal the content should be, a writing style of the content, and other characteristics, such as limits on what words and phrases available for use in the content. In addition to user specified rules the content generation system (100) may identify and follow pre-set rules in order to optimize the content according to metrics such as search engine ranking and readability, or to ensure that the content is sufficiently unique. The content generation system may include functionality to search for, request, receive and select data items including technical details, text, and terminology related to the subject matter of the content, as well as information describing aspects of the business entity for which the content is being generated.

In one embodiment of the invention, the content generation system (100) may include a number of components including a data acquisition module (108), a data analysis module (110), and a content generation module (112). In one embodiment of the invention, the content generation system (100) is connected to a user application (102). The user application (102) may include a user interface (104) which may be used by the user to access and control the content generation system (100) and to pass input instructions, information and other data items for use by the content generation system (100). Additionally, the content generation system (100) may have access to one or more data repositories (106) which store data to be used in the generation of unique content. In one embodiment of the invention, one or more of the components of the content generation system (100), as well as the user application (102) and the data repository (106) may be connected to one another over a network (not shown). The content generation system (100) may include functionality to access the internet to acquire data items, text and information to use in the content.

In one embodiment of the invention, a user is able to access the content generation system (100) through a user application (102). The user application (102) may be, for example, a financial management application (capable of managing personal, business, or other financial matters), web design software, or a word processor. Alternately, the content generation system (100) may be provided by a service or company which offers consultation on managing and promoting a business or service. The content generation system (100) may be a sub-process of the user application (102). Alternately, the content generation system (100) may be a distinct application that is either accessed directly by the user, or invoked by the user application (102). In one embodiment of the invention, the content generation system (100) may be executed by an entity distinct from the user, who accesses the content generation system (100) remotely. For example, the interface by which the content generation system (100) is accessed may be provided by a website, accessed by the user via a browser. The content generation system (100) might alternately be a remote service provided by a server accessible only to the user application (102).

In one embodiment of the invention, the user application (102) includes a user interface (104). The user interface (104) may enable the user to provide requirements, preferences, and other limitations to the content generation system (100) to more closely control the content being generated. The user interface (104) may also allow the user to follow the step being performed by the content generation system (100) in order to verify the accuracy and origin of the terminology and information being used in the content. These requirements and preferences may include, for example, a length of the text, a desired level of detail or density of information for the content, specific areas of subject matter to be covered, and other details. In one embodiment of the invention, the aforementioned requirements and preferences may be used to select a content template as well as other data items that include useful terminology and information to be included in the content. In one embodiment of the invention, a 'tone' of the content may be specified. A 'tone' may indicate a desired level of formality of the content, a writing style of the content, a level of readability or accessibility targeted at a specific group or type of customer, and the like. In one embodiment of the invention, the user interface (104) may include functionality to request that the user provide data items which include information and terminology to use in the generation of content. The user interface (104) may further include functionality to receive said data items from the user in response to the request. Specific data items that might be requested and received by the content generation system (100), as well as how they might be used, will be discussed in greater detail in the description of FIG. 2 below.

In one embodiment of the invention, the content generation system (100) includes or has access to a data repository (106). The data repository (106) may be locally accessible to, or even included in, the content generation system (100) or accessed remotely via a network connection. The data repository (106) may be used to store content templates and terminology libraries which are used as components in the generation of content. In one embodiment of the invention, a content template may be pre-generated text which includes blank spaces or certain words marked for replacement. A content template may also include instructions on how it should be modified in order to make the resulting content unique. A terminology library may be a list of words and phrases related to a given template or subject matter covered by the content. Templates and libraries will be discussed in detail in the description of FIG. 2 below.

In one embodiment of the invention, the content generation system (100) may have access to multiple data repositories (106). Different data repositories (106) may store templates and libraries related to different topics or styles of template. One or more of the multiple data repositories (106) may be controlled by other entities and may be originally intended for uses other than content generation.

In one embodiment of the invention, the content generation system (100) includes a data acquisition module (108) which includes functionality to search for data items relevant to the business entity and subject matter covered by the content. The data items might include text, terminology, and information that can be used to describe the business entity as well as the industry of the business entity, the history of the business entity, and any other subject matter that might be desirable to include in the content. The data items may be obtained from numerous sources, including: the user, via the user interface (104); locations recommended by the user or by analysis of extant data items; searches of the aforementioned data repositories (106); internet searches; and any other method by which data may be acquired autonomously.

The data acquisition module (108) may also include functionality to evaluate the results of searches to determine if they include data items useful for the generation of content. In one embodiment of the invention, the data acquisition module (108) may include functionality to receive search terms and specific characteristics to search for specific required data items. The data acquisition module (108) may also search for any relevant data items related to given subject matter. For example, the data analysis module (110) may analyze data items to determine additional search terms which are passed to the data acquisition module (108) to find additional data items. Alternately, the content generation module (112) may instruct the data acquisition module (108) to search for synonyms to words used in the content, or for alternate phrases or terminology to use in the modification of content. The data acquisition module (108) and associated functionality are discussed in greater detail in the description of FIG. 2 below.

In one embodiment of the invention, the content generation system (100) includes a data analysis module (110), which includes functionality to analyze obtained data items to extract useful terminology, words, phrases, and other text to use be used in the content. For example, if the user provided a document that included descriptive text relevant to the content being generated, the data analysis module (110) might analyze the document to extract words that matched characteristics needed to generate the content. The data analysis module (110) may also perform analysis to determine that additional data items and specific characteristics of those data items that are required for the generation. For example, the data analysis module (110) may analyze a template selected to be used in the content to determine what parts of speech are required to complete the template. In one embodiment of the invention, the data analysis module (110) includes functionality to determine search terms that may be used by the data acquisition module (108) to obtain additional data items.

In one embodiment of the invention, the content generation system (100) includes a content generation module (112), which includes functionality to combine the template and various required words and phrases to generate raw content. The content generation module (112) may include functionality to obtain content templates, words, phrases and other text from the data analysis module to be used for generating the raw content. In one embodiment of the invention, the content generation module (112) may include functionality to modify parts of the raw content to increase the uniqueness of the content, to affect a 'tone' of the content, to improve the readability or ranking in a search engine index, or to conform to a parameter specified by the user. Potential modifications may include, for example, the replacement of specific terms and phrases with synonyms or alternate wordings, the reordering of sentences and paragraphs, or the addition or omission of specific details or stylistic choices specified by the user.

Figure 2:
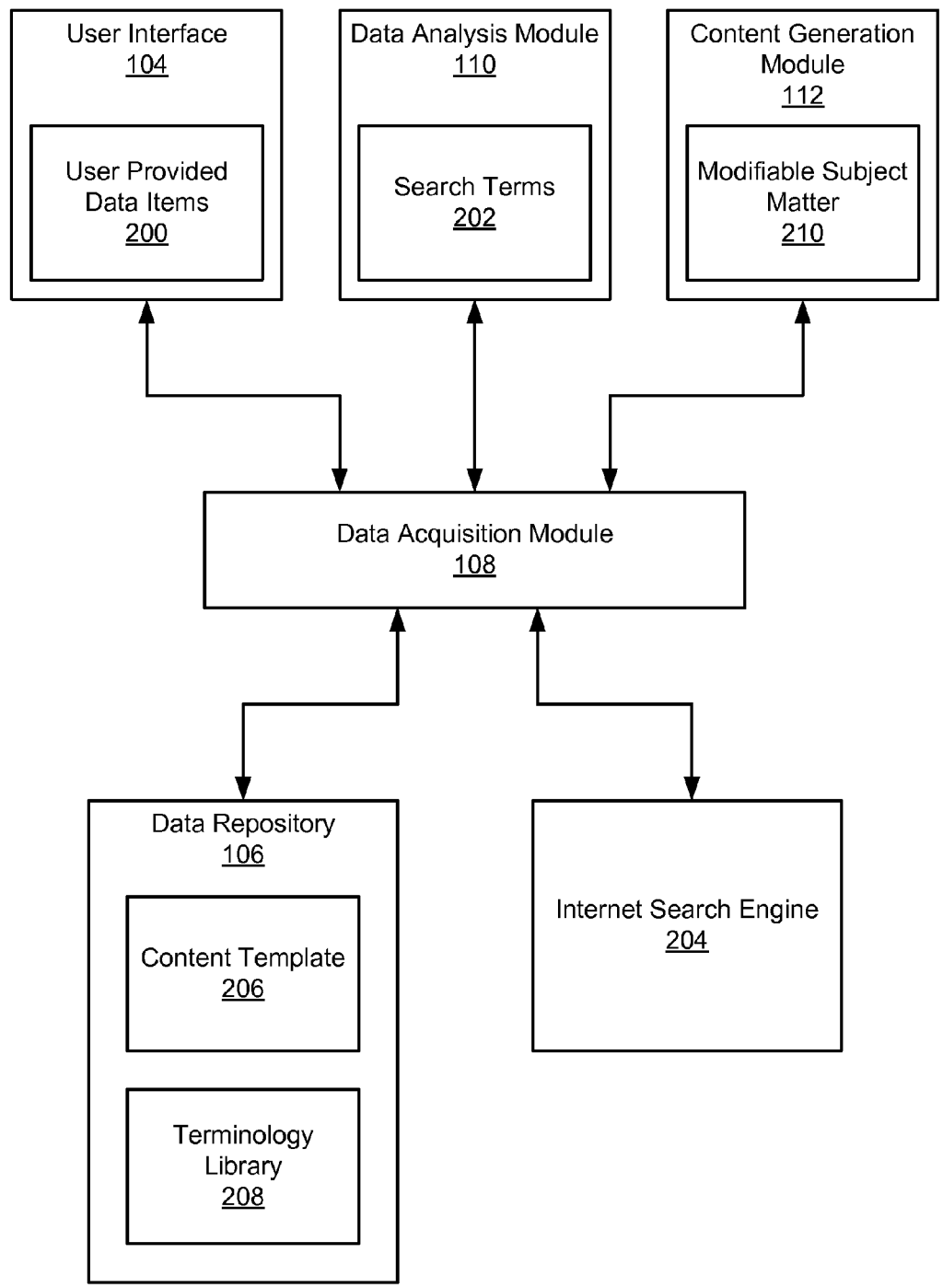
FIG. 2 shows the data acquisition module of the content generation system in accordance with one embodiment of the invention.

FIG. 2 shows the data acquisition module (108) and its connection to the other components of the content generation system (100) in detail. In addition to the data acquisition module (108), the user interface (102), data repository (106), data analysis module (110), and content generation module (112) are the same or fundamentally similar to those discussed in the description of FIG. 1. Also included is an internet search engine, to which the data acquisition module (108) is connected.

In one embodiment of the invention, the data acquisition module (108) is able to receive data items (200) from a user through the user interface (104). The user provided data items (200) may include specific information related to a business entity or related subject matter being described of the content. For example, a business entity might provide data items (200) that include information such as name, location, contact information, size, products and services, hours, and other information specific to the operation of the business entity. Additionally, the user provided data items (200) might include information related to the industry or practice area of the business, data describing the history of the business, a mission statement or goal, reviews of the business, publications, awards and other accolades and other text relevant to content describing the business. The user provided data items (200) may also include text that resembles the content the user desires. This content may be, for example, earlier attempts by the user to generate their own content, or similar content used by other entities in the same business area. In one embodiment of the invention, the data acquisition module (108) may include functionality to request specific data items, or data items possessing specific characteristics in order to completely generate content. In one embodiment of the invention the user provided data items may include potential search terms or likely locations and resources that the data acquisition module may use to search for additional data items.

In one embodiment of the invention, the data acquisition module (108) includes functionality to communicate with a data analysis module (110) in order to evaluate data items that have been collected. As discussed above, the data analysis module (110) may include functionality to analyze the data items to identify words, phrases and information to include in the content. In one embodiment of the invention, in addition to identifying items to add directly to the text, the data analysis module (110) includes functionality to determine missing data items that will be required in order to fully generate content, and also identify search terms that may potentially be used by the data acquisition module (108) to search for the required data items; the data analysis module may also include functionality to identify search terms that may be used to obtain additional data items, which may be useful in the generation of content.

For example, if a certain template has been selected to use as a base for generating the content, the data analysis module (110) may determine from the blanks or replaceable terms in template specific characteristics of terminology that will need to be obtained in order to successfully fill out the template. The characteristics may include specific information that is described by a data item, a part of speech of a keyword required for a specific blank, or a specific connotation associated with the term. Once the data analysis module (110) has determined a specific need or potential source of additional data, that information is communicated to the data acquisition module (108) which may then search for the appropriate data items.

In one embodiment of the invention, the data acquisition module (108) includes, or has access to, an internet search engine (204). The data acquisition module (108) may use search terms provided by the user, by the analysis of other data items by the data analysis module (110), or may use search terms associated with a specific content template or terminology library and identified as potentially useful. The internet search engine (204) may be a provided by a third party. Alternately, the internet search engine (204) may be customized specifically for performing searches to obtain text, terminology and data items specific to the modification of content. In the either case, the search terms may need to be formatted specifically to be used in the search engine (204). The data acquisition module (108) may include functionality to specify the parameters of the search, including locations searched, terms used for the search, specific data items or types of data items being searched for, and other filters on the results.

In one embodiment of the invention, the data acquisition module (108) searches the data repository (106) to obtain a content template (206) to use as the basis for the content to be generated. In one embodiment of the invention, a content template (206) may have characteristics associated with a particular subject matter, a 'tone', or a writing style. A content template (206) with appropriate characteristics may be selected based upon preferences and restriction provided by the user. In one embodiment of the invention, a content template (206) is a block of text that includes blank spaces or portions of the text designated as replaceable. The content template (206) may include requirements or characteristics of the potential words, phrases, or text that will be swapped into the content template (206) in place of the blanks or replaceable text. In one embodiment of the invention, the content template (206) is a block of text possessing characteristics similar to those desired in the content being generated. The content template (206) might be content previously generated or obtained by the content generation system. The content template (206) might also be derived from or based upon said previously generated or obtained content. In one embodiment of the invention, the content template (206) may be acquired from sources other than the data repository (106) such as from the user, or by searching the internet. In one embodiment of the invention, multiple content templates (206), or portions of multiple content templates (206) are combined to used in the generation of a single content.

In one embodiment of the invention, the data acquisition module (108) searches the data repository (106) to obtain a terminology library (208), which includes words, phrases, and other text which might be used to fill or alter the of the content template (206) selected to generate content. A terminology library (208) may include terminology related to a specific type of subject matter, a specific level of complexity, formality, or 'tone', or may be associated with a specific content template (204). Words and phrases in a terminology library (208) may include metadata that describes characteristics of the words and may dictate the appropriate use of the words within the content. This metadata may include, for example, a type of information described by a specific word, what part of speech that word has, a connotation or tone that the word may be associated with, and other data that might aid in integrating a word or phrase seamlessly into the content. In one embodiment of the invention, a terminology library (208) or partial terminology library (208) also is provided by the user which includes terms that the user wants used in the content.

In one embodiment of the invention, the data acquisition module (108) is connected to a content generation module (112). In one embodiment of the invention, the content generation module (112) includes functionality to combine the words, phrases, and information collected and analyzed by the data acquisition module (108) and data analysis module (110) and the content template (206) selected to generate raw content. The raw content is a complete text, but lacks optimization and is not necessarily unique. In one embodiment of the invention, the content generation module (112) includes functionality to modify the raw content to create unique content. The modification may include the replacement, insertion, deletion and reordering of individual words, phrases, sentences, and paragraphs with alternate content such as synonyms, different wordings, the reordering of content, the insertion and removal of terms to modify the characteristics of the content such as length, detail, readability, formality, search engine indexing and other qualities of the text.

In one embodiment of the invention, the content generation module (112) includes functionality to request the data acquisition module (108) obtain data items related to or including the aforementioned alternate content. As a supplement to the request, the content generation module (112) may provide the data acquisition module (108) with parameters with which to search for and select appropriate alternate content to be used. The parameters may be derived from the data items used in the raw content or they may be the portions of the text itself, or some combination thereof. Additionally, the data acquisition module (108) may request the user provide portions of the alternate content.

For example, if the content generation module (112) is personalizing the content for the business, the data acquisition module (108) may be prompted to request that the user provide a specific term by the business in place of the word 'customer'. Alternately, if the content was being optimized to rank higher in a search engine index, the data acquisition module (108) may be provided with a specific term used in the raw content. The data acquisition module (108) may then identify the most commonly used synonym or synonyms of term within the context of the subject of the content, and provide them to the content generation module (112) so that a more commonly used term or a wider variety of terms may be used in the content in place of the original term.

Figure 3:
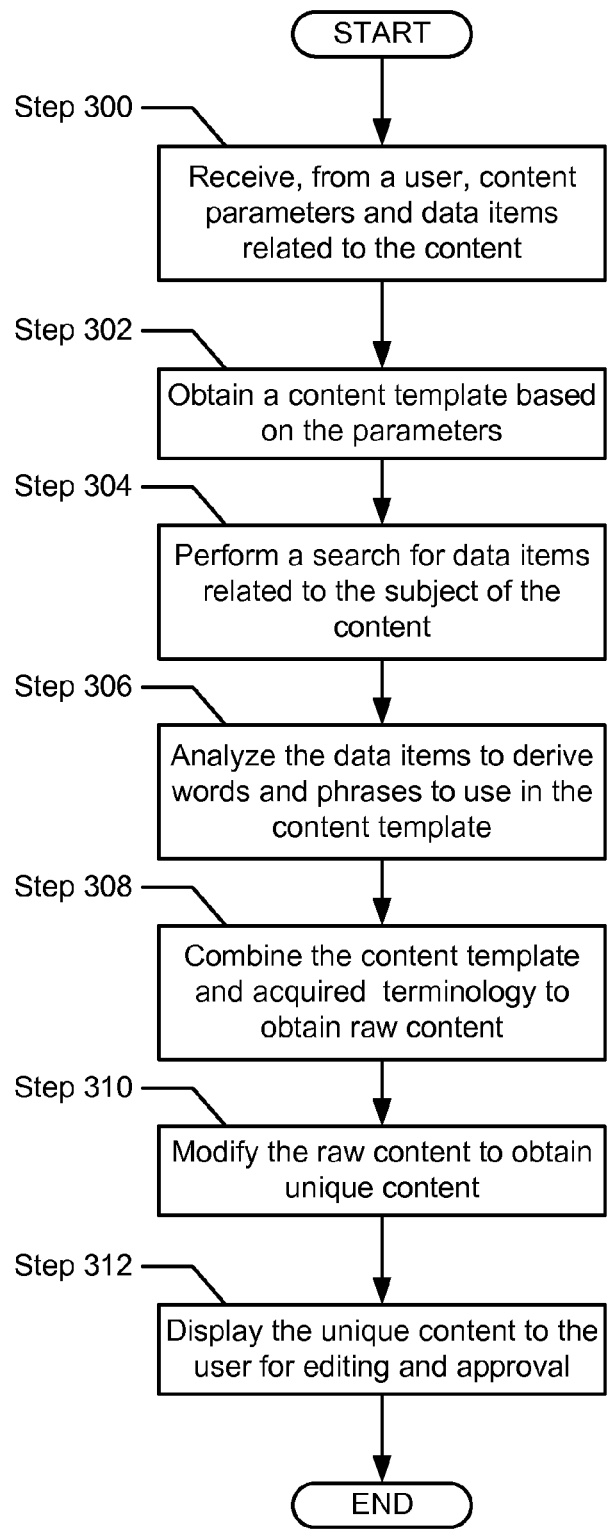
FIG. 3 shows a flowchart for generating content in accordance with one embodiment of the invention.

FIG. 3 shows a flowchart of a method for generating content in accordance with one embodiment of the invention. While the various steps in the flowchart are presented and described sequentially, one of ordinary skill will appreciate that some or all of the steps may be executed in different orders, may be combined or omitted, and some or all of the steps may be executed in parallel.

In Step 300, parameters and data items are received from the user in accordance with one or more embodiments of the invention. The parameters may include requirements and restrictions on characteristics and subject matter of the content. The parameters may additionally specify desired characteristics of the content such as a tone or level of formality, a readability or level of accessibility of the language, and topics or subjects to be discussed in the content. In one embodiment of the invention, the user may also provide data items that include information on the business entity and subject to be included in the content. The data items may include, for example, a name, location, contact information, and other details pertaining specifically to the business entity. In one embodiment of the invention, the content generation system includes functionality to obtain this information from a financial application of the user or database of information collected a financial application of the user. The user may specify an appropriate account or financial application from which to obtain said information as one of the data items provided.

In one embodiment of the invention, the user provided data items include information describing characteristics or accomplishments of the business entity, such as the history of the business entity, data describing some or all of the employees of the business, a mission statement or goals, reviews, awards and accomplishments, publications, and other. In one embodiment of the invention, the data items provided by the user may include one or more blocks of descriptive text similar to desired content. The blocks may be used to obtain terminology to use in the content, or may be used as a content template upon which to base the content.

In Step 302, a content template is obtained based on the parameters in accordance with one or more embodiments of the invention. The content template may be stored in a data repository connected to the content generation system. The content template may be selected based upon the subject matter of the content, based upon a tone or level of formality of the content, or selected based upon some other characteristic required by the user. As discussed above, in one embodiment of the invention, the content template may be extracted from text acquired as part of the data item collection process; this text may come from the user or from a search of the web. In one embodiment of the invention, the data repository includes text from multiple instances of previously generated content, and may be selected based upon a similarity to the desired content. In one embodiment of the invention, the content includes or specifies a library of terminology to be retrieved and used in combination with the template to generate the content.

In Step 304, a search is performed to find data items related to the subject matter of the content in accordance with one or more embodiments of the invention. The search may be performed using the previously acquired data items as search terms. Alternately, or additionally, the previously acquired data items may be analyzed to determine search terms. In one embodiment of the invention, an analysis of the content template as well as the previously acquired data items is used to determine data items that may be used to obtain specific terminology required to complete the generation of content. The search may be limited, by the user, by the search terms, or by the system itself. In one embodiment of the invention, a third party website based internet search engine is used to perform the search. Alternately a task-specific search engine integrated into the content generation system may be used. In one embodiment of the invention, certain locations, both on the internet, and locally, are preferentially searched. Additionally, the user may specify likely locations of relevant data items. In one embodiment of the invention, in addition to search terms, additional requests to the user are generated based off the analysis of the previously acquired data.

In Step 306, the data items are analyzed to derive words and phrases to place in the content in accordance with one or more embodiments of the invention. In one embodiment of the invention, the first data item analyzed is the content template. Alternately, data items provided by the user may be analyzed in order to determine an appropriate selection for the content template. In one embodiment of the invention, multiple content templates are selected and combined to create the base for the content to be generated. In this case the templates may be analyzed to select the appropriate portions to combine to form the base. A content template may include blocks of text including blank spaces and specific words marked for replacement. The blank spaces and replaceable words may include associated metadata labels which provide guidelines for acceptable words to be inserted in their place. In one embodiment of the invention, a content template specifies one or more libraries of terminology appropriate for inserting in place of the blanks/replaceable words. Other acquired data items may be analyzed to determine appropriate libraries to select. In one embodiment of the invention, terminology to be used in the content is extracted directly from the acquired data items. In one embodiment of the invention, search terms used for the acquisition of additional data items may be sought as well.

In Step 308, the content template is combined with the keywords, phrases, and other terminology, as well as information about the subject of the content acquired directly from the user to generate raw content in accordance with one or more embodiments of the invention. The raw content may be a block of human-legible text that has not been modified to make it unique. This means that it will still bear superficial similarities to other raw content generated using the same template or libraries.

In Step 310, the raw content is modified to generate unique content in accordance with one or more embodiments of the invention. In one embodiment of the invention, modifying the raw content includes identifying individual words and phrases that are eligible for replacement with synonymous terms or alternate wording, identifying sections of text that can be reordered, and places where specific text and terminology may be inserted or removed. In one embodiment of the invention, the words and phrases eligible for replacement are used as search terms to find synonyms with which they can be replaced in the modified content. The synonyms may be selected based characteristics such a formality, complexity, search engine index or others specified by the user. In one embodiment of the invention, during the modification, the raw content may be reduced or padded to reach a certain length. In one embodiment of the invention, similar content of other business entities in the same industry are analyzed in order to make the content being generated more or less closely resemble it.

In Step 312, the completed unique content is displayed back to the user for editing and approval in accordance with one or more embodiments of the invention. The user may opt to correct any errors, add or remove content as they deem fit, and otherwise modify the content in any way. In one embodiment of the invention, any modifications made by the user are added to a repository to be analyzed in order to improve the heuristics used in the generation of content. After the user has approved the content, the final content may be analyzed to extract a potential content template and terminology libraries for future use by the content generation system.

Figure 4:
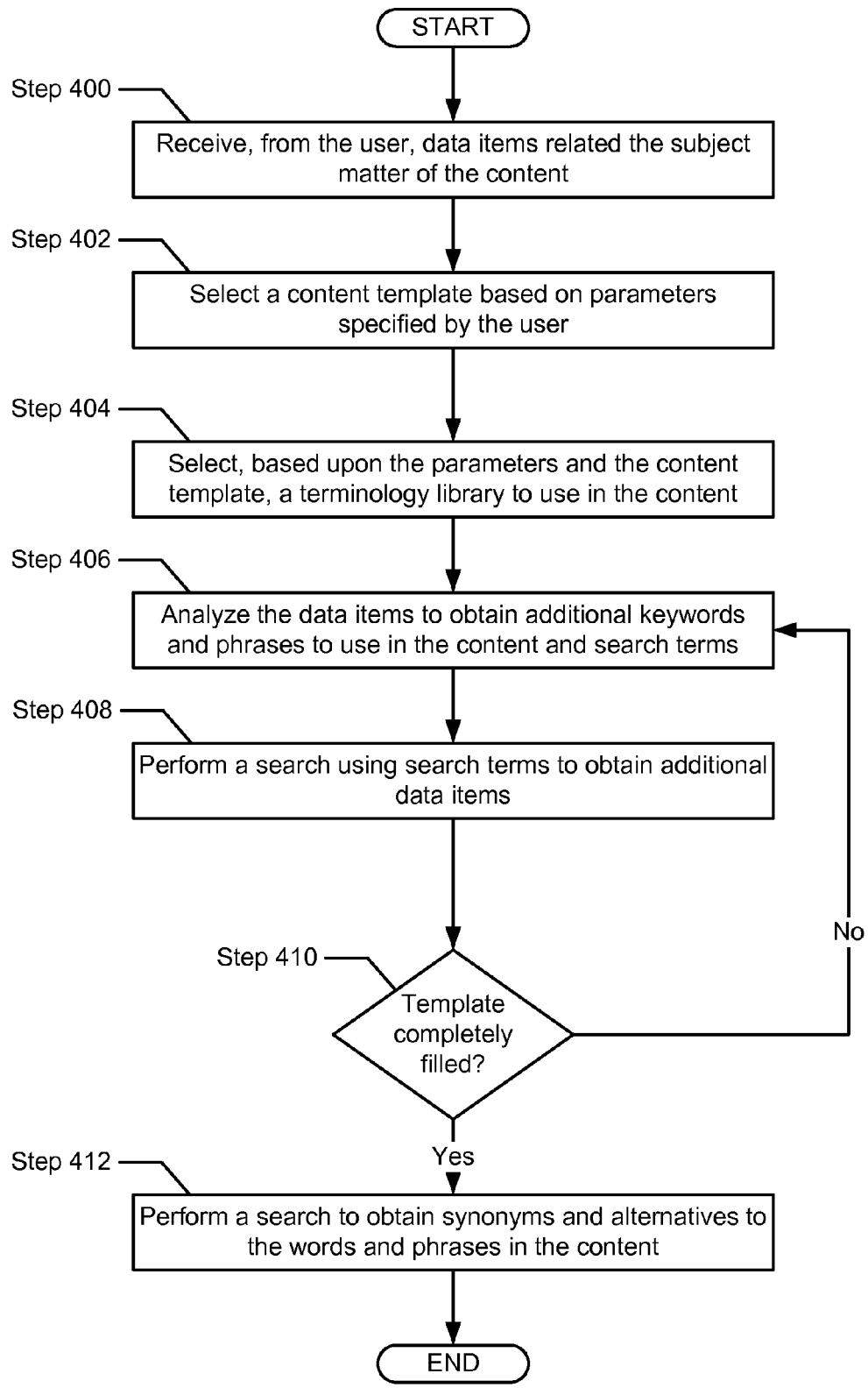
FIG. 4 shows a flowchart for acquiring data items used in the generation of content in accordance with one embodiment of the invention.

FIG. 4 shows a flowchart of a method for acquiring content in accordance with one embodiment of the invention. While the various steps in the flowchart are presented and described sequentially, one of ordinary skill will appreciate that some or all of the steps may be executed in different orders, may be combined or omitted, and some or all of the steps may be executed in parallel.

In Step 400, similar to Step 300 as previously described, data items related to the subject of the content are received from the user in accordance with one or more embodiments of the invention. The data items received from the user may include specific information on the business entity that the text is describing. The specific information may include, for example, a name, location, contact information, size, products and prices, and other information that might be useful to include in the content being generated. The data items may also include reviews, awards, historical trivia, and other qualitative information describing the business entity. In one embodiment of the invention, the data items may include a specification of an account with a financial database or application from which the content generation system may retrieve some or all of the information listed above. The user may also provide text and terminology for use in the content. In one embodiment of the invention, the content template used as the base for the content may be extracted from an appropriately formatted and detailed block of text provided by the user.

In Step 402, similar to Step 302, a content template is selected to be used as a base for the content in accordance with one or more embodiments of the invention. The content template may be selected based an analysis performed on the data items provided by the user; alternately, or additionally the selection may be based on any rules, restrictions or preferences submitted by the user. In one embodiment of the invention, portions of multiple extant content templates are combined to create an appropriate base upon which the content will be created. In one embodiment of the invention, a block of text similar to the desired content is analyzed to extract a content template, or a portion of one, to be used. The block of text may be provided or selected by the user, or acquired via a search of the various data repositories and the internet which the content generation system is connected to.

In Step 404, one or more libraries of words and phrases are selected to be used in the content in accordance with one or more embodiments of the invention. In one embodiment of the invention, the content template or templates selected specify one or more libraries which include appropriate terminology to combine with them during the generation of content. Additionally, analysis of previously acquired data items may factor in to the selection of a library to use in the content. In one embodiment of the invention, a library may be created by extracting appropriate terminology from a block of text acquired as one of the data items.

In Step 406, the data items that have been collected thus far are analyzed to identify keywords, phrases and other terminology or relevant information to combine with the with the template in order to generate content in accordance with one or more embodiments of the invention. In one embodiment of the invention, the keywords and phrases in the data items are obtained by identifying uncommon words in text. The appropriateness of using a word or phrase for a specific purpose in the content may be verified by obtaining a definition or frame of reference for the use of the word or phrase by performing a search; the search might be of the internet, of a local dictionary, or of other reference material. In one embodiment of the invention, the content generation system includes functionality to modify a tense or other characteristic of the term in order to better fit it to the content template. In one embodiment of the invention, the word or phrase extracted is used as a search term to obtain a more appropriate mode of the term for use in the content.

Continuing with Step 406, in one embodiment of the invention, the data items describing the business are mined for descriptive information. The user may be prompted to directly provide the information, for example, by presenting the user with a generic form, and then extracting the appropriate information later. Alternately, the user might provide a website address linking to the contact information of the business. The content generation system might then leverage that website address as a potential search location to obtain data required in the generation of content. In one embodiment of the invention, the user might access the content generation system using a financial application. In this case the content generation system might request access to data on the business entity stored in the financial application. Alternately, the user might grant the content generation system access to a data repository storing the information at the behest of one or more applications or services.

Continuing with Step 406, in one embodiment of the invention, an analysis of the parameters specified by the user and the requirements of the content template selected indicate the necessity of acquiring terms and text that include certain information and have certain properties. For example, the content template might include a blank that specifies a verb describing actions performed by the business. Appropriate search terms might therefore be generated using those requirements, and other known data about the business in order to provide a context for the search.

In Step 408, a search is performed using the aforementioned search terms in order to obtain additional data items in accordance with one or more embodiments of the invention. The search may be performed on a data repository that includes a number of libraries; on other content that the content generation system has access to, to attempt to locate similar conditions to those of the content being generated; or, simply, a search of the internet itself using the search terms determined in the previous step. For example, based on analysis of the available data items, the search terms might include a specific type of word, a specific type of information sought, a specific connotation or 'tone' of the word, likely locations for the information to be found, and potential variations of the word that may exist. In one embodiment of the invention, initial internet searches are performed to obtain large volumes of potential useful data items to analyze, rather than items conforming to very specific limitations.

In Step 410, a determination is made as to whether the analysis and subsequent searches have identified sufficient keywords and phrases to completely fill the blanks of the template in accordance with one or more embodiments of the invention. If not, then Steps 406 and 408 may be repeated with varying parameters until this is the case. If so, then the currently available terminology and information are combined with the content template to generate raw content. Raw content may simply be the result of matching terminology and information to the appropriate blanks in the content template.

In Step 412, during the process of modifying the raw content to generate unique content, a search is performed to obtain synonyms and alternatives to words and phrases eligible for replacement in accordance with one or more embodiments of the invention. As with steps 406 and 408, an analysis of the available data items, the raw content, the restrictions and preferences specified by the user, and other rules for optimization and randomization, may be used to obtain search terms in order to obtain the data items required to sufficiently modify the raw content to make it unique and conform to the user's preference. The content generation and modification is covered in detail in the description of FIG. 5 below.

Figure 5:
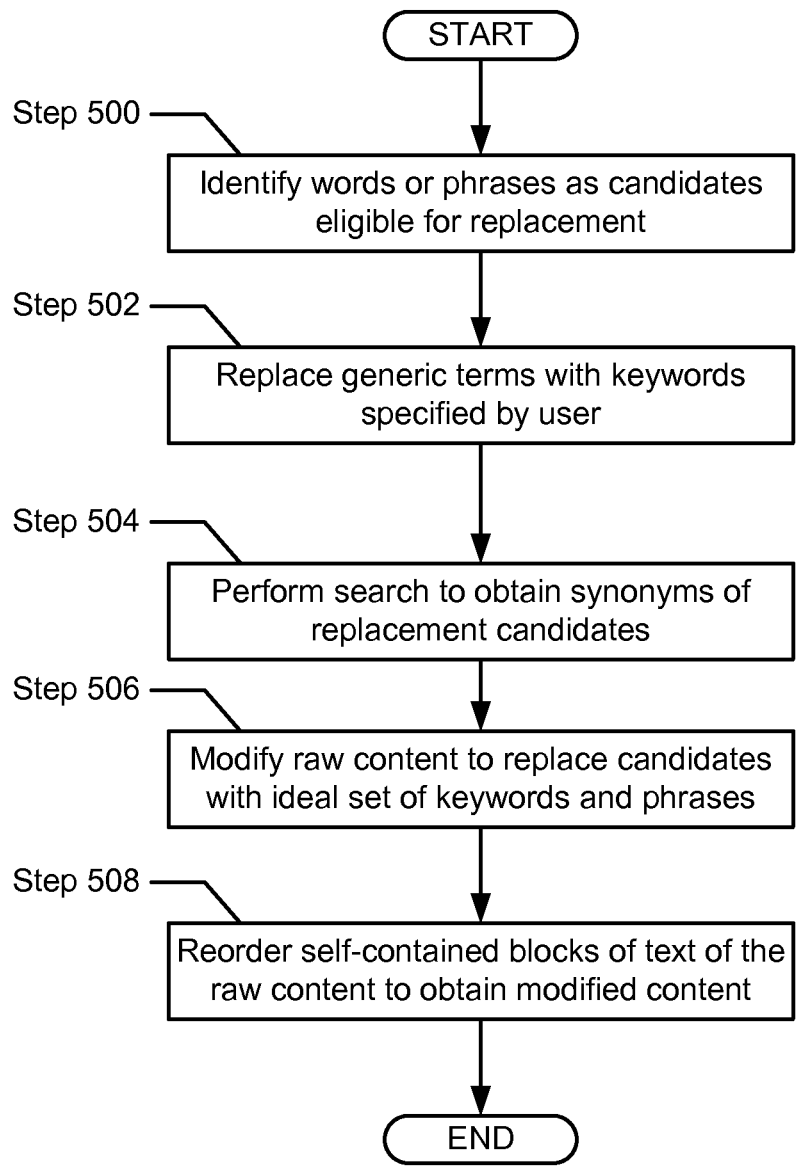
FIG. 5 shows a flowchart for modifying raw content generated by the content generation system to generate unique content in accordance with one embodiment of the invention.

FIG. 5 shows a flowchart of a method for modifying content to generate unique content. While the various steps in the flowchart are presented and described sequentially, one of ordinary skill will appreciate that some or all of the steps may be executed in different orders, may be combined or omitted, and some or all of the steps may be executed in parallel.

In Step 500, eligible words and phrases are identified as candidates for replacement in accordance with one or more embodiments of the invention. In one embodiment of the invention, candidates are deemed eligible for replacement for many reasons. An alternate term may be preferred by the user, the presently used term is excessively generic, technical or specific, a term may be too casual or formal, a greater variety of terminology is preferred in order to boost a search rank of a webpage, or replacing the term will simply improve the uniqueness of the content being generated. If a word or phrase is a candidate for replacement, search terms may be generated that are optimized to find a more suitable replacement in an internet search.

In Step 502, in accordance with one or more embodiments of the invention, generic terms in the raw content are replaced with preferred terms of the business entity, as specified by the user. If the user has specified that the business entity described in the content has certain specific terms that it uses, any synonyms of those terms in the raw content may be replaced with the preferred version. For example, if the business entity is a law firm, it might prefer that the term 'customer' in the content instead read 'client'. Conversely, if the business were a doctor's office, the preferred term might be 'patient'.

In Step 504, a search is performed to determine synonyms and potential replacement text for terms in the raw content deemed eligible for replacement in accordance with one or more embodiments of the invention. The search may be performed using search terms derived in a manner similar to that discussed in the description of Step 502 above. As with the search performed in FIG. 4, the search may be performed on a number of potential sources. In one embodiment of the invention, there may be multiple dictionaries associated with a single content template, but separated by the area of business described therein. Thus the content generation system might acquire appropriate replacement terminology from the library associated with the area of the business entity being described. Alternately, a thesaurus might be referenced; similar content stored by the content generation system might be identified using other data items and the appropriate terminology might be identified by its usage in the similar content. In one embodiment of the invention, a simple internet search is performed to identify an appropriate synonym using additional data items to provide context for the search.

In one embodiment of the invention, if the content is being replaced to optimize the content for formality, accessibility, search engine index, variety, or other qualities, similar techniques to those described above may be used. Additionally, the content generation system may include functionality to access external resources specifically geared toward ascertaining the popularity or ubiquitousness of a specific word or phrase that is being used.

In Step 506, the raw content is modified by replacing the eligible terms in the raw content with the keywords and phrases selected as ideal in accordance with one or more embodiments of the invention. In one embodiment of the invention, the replacement terms obtained in the previous steps may need to be modified slightly to fit the context of the content. Alternately, the content itself may need to be modified to accommodate the appropriate term. In one embodiment of the invention, the terms obtained may not replace existing terms or be inserted into blanks of the text, but are added to the existing content in addition to other terms. Similarly, some existing text, terminology and information may be excised.

In Step 508, self-contained blocks of text of the raw content are reordered and rearranged to generate the unique content in accordance with one or more embodiments of the invention. This may be performed to individual sentences, to groups of sentences, and to entire paragraphs within the content. In addition, the contents of individual sentences may be rearranged or altered. In one embodiment of the invention, sentences may be merged together or split during the reordering process. The degree to which the modification of the raw content is performed may be determined by comparing the content to a baseline content to ensure a sufficient degree of independence and uniqueness from the generic version.

Figure 6:
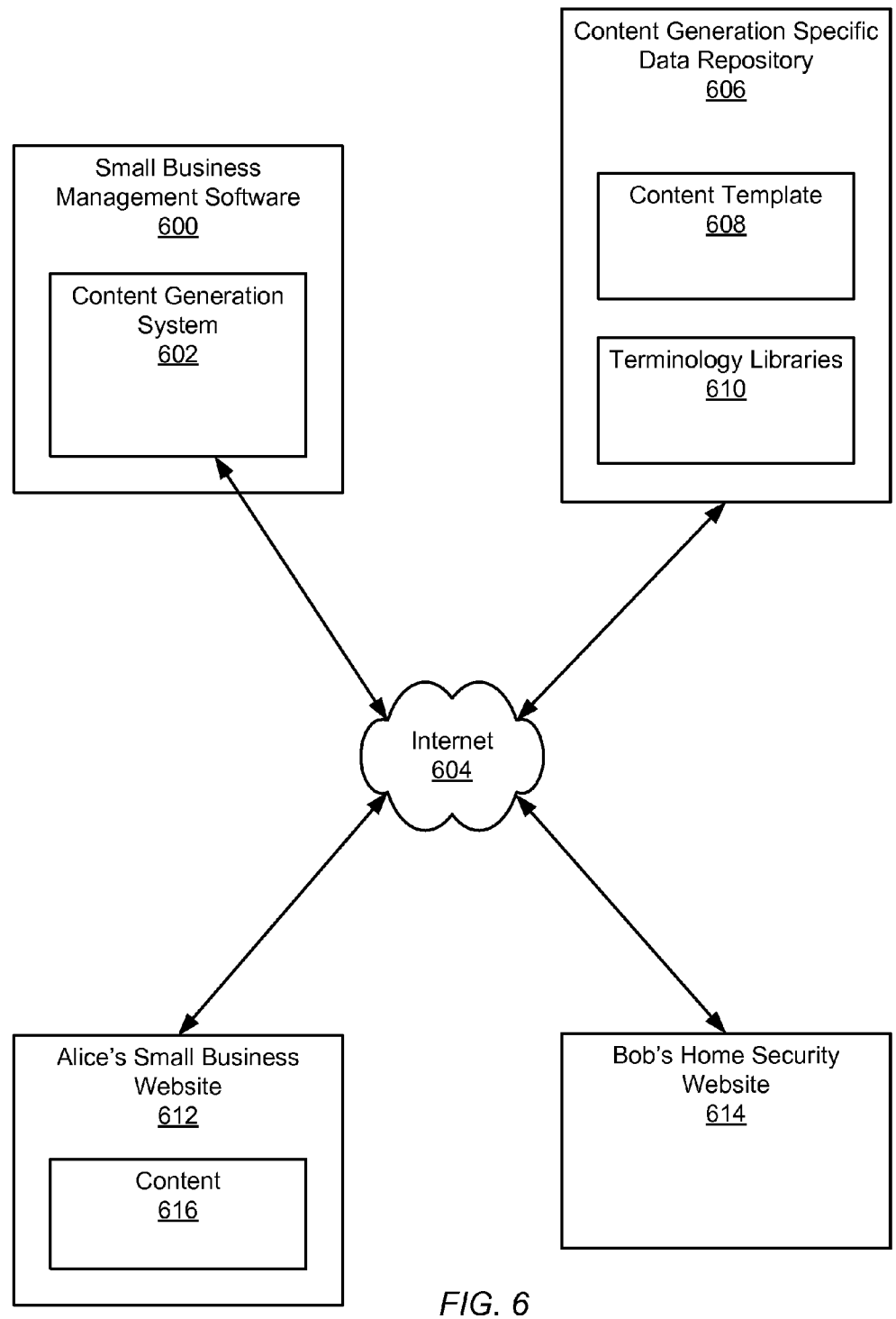
FIG. 6 shows an example for generating unique content in accordance with one embodiment of the invention.

FIG. 6 shows an example of a customer using the content generation system in accordance with one embodiment of the invention. In the example, Alice has recently started a small business manufacturing and distributing house keys and locks to retailers. She has decided to create a website, but does not know what content to place on the home page. Fortunately, some small business management software (600) that she has recently purchased has a 'promote your business' module that includes a content generation system (602). Alice decides to use the content generation system (602) to create a few paragraphs of introductory text to use as content (616) on the home page of Alice's small business website (612).

Upon loading the content generation system (602), Alice is prompted with a 'new content' menu. The 'new content' menu includes fields which allow her to provide information about her business, as well as options allowing her to specify parameters and specific subject matter for in the content (616). Additionally, the 'new content' menu includes fields for providing existing content, and specifying information, such as website addresses, local applications and files, and search terms that maybe be used to obtain data relevant to generating the content (616). Since the content generation system (602) is integrated into Alice's small business management software (600), she selects an option that allows the content generation system (602) to import information describing her business obtained by other modules of the small business management software (600), such as accounting and inventory. She then provides additional data that she wishes to be included, specifies a length of three paragraphs, and a 'casual' tone for the content (616). She further provides the search terms 'house key' 'locks' and 'deadbolt'.

The content generation system (602) uses the information obtained from Alice to perform a search of an online content-generation-specific data repository (606) via an internet (604). The search obtains a casual-tone, three paragraph long content template (608). Then based upon the content template selected and the search terms provided, two terminology libraries (610) are selected, one corresponding to the tone and language used in the content template (608), and one corresponding to terminology frequently used in the 'lock and key' industry. A further search of the internet (604), based on the search terms provided by Alice, is performed to obtain data items to be incorporated into the content (616). The search also turns up the website (614) for Alice's competitor, "Bob's Home Security". Upon determining that Bob's business is sufficiently similar to Alice's business, the content generation system (602) analyzes the content on Bob's website (614) to obtain additional data items and terminology and to determine appropriate context for industry-specific words and phrases, in order to properly use those terms in the content generation.

An analysis performed on the content template (608), terminology libraries (610, and data items is used to partially fill in the blanks of the content template (608). However, blanks of the content template (608) remain unfilled, specifically, a blank that requires a verb corresponding to an action performed by the product 'key' sold by Alice, and a noun corresponding to a location of the product 'lock' sold by Alice. The content generation system (602) performs two searches of the internet (604); a first search using the search terms 'verb' and "action by key" returns the word 'unlock', and a second search using the search terms 'noun' and "location of lock" returns the word 'door'.

After each blank in the content template (608) has been satisfactorily filled, the content generation system (602) 'spins' or modifies the content to make it unique. During the modification of content (616), the paragraphs and sentences of the content template (608) are reordered, words and phrases within sentences are rearranged, and some text is added and removed as necessary. Here, certain words and phrases retrieved from the content on Bob's website are determined to be synonymous with less industry specific terms used in the content template (608), and swapped.

After the modification process has been completed, the final content (616) is provided to Alice for approval. Alice makes minor corrections based on personal preference and correctness and approves the content (616). The content (616) is then uploaded to Alice's website (612). Additionally, the approved content (616) may be analyzed for future use. Any modifications made by Alice may be observed and recorded to be implemented by the heuristics used in content generation. Further, the approved content (616), as well as the data items collected may be analyzed to create additional terminology libraries (610). Finally, Alice's approved content (616) and the content located on Bob's website (614) may both be converted into content templates (608) for future use in generating casual, lock-and-key related content.

Figure 7:
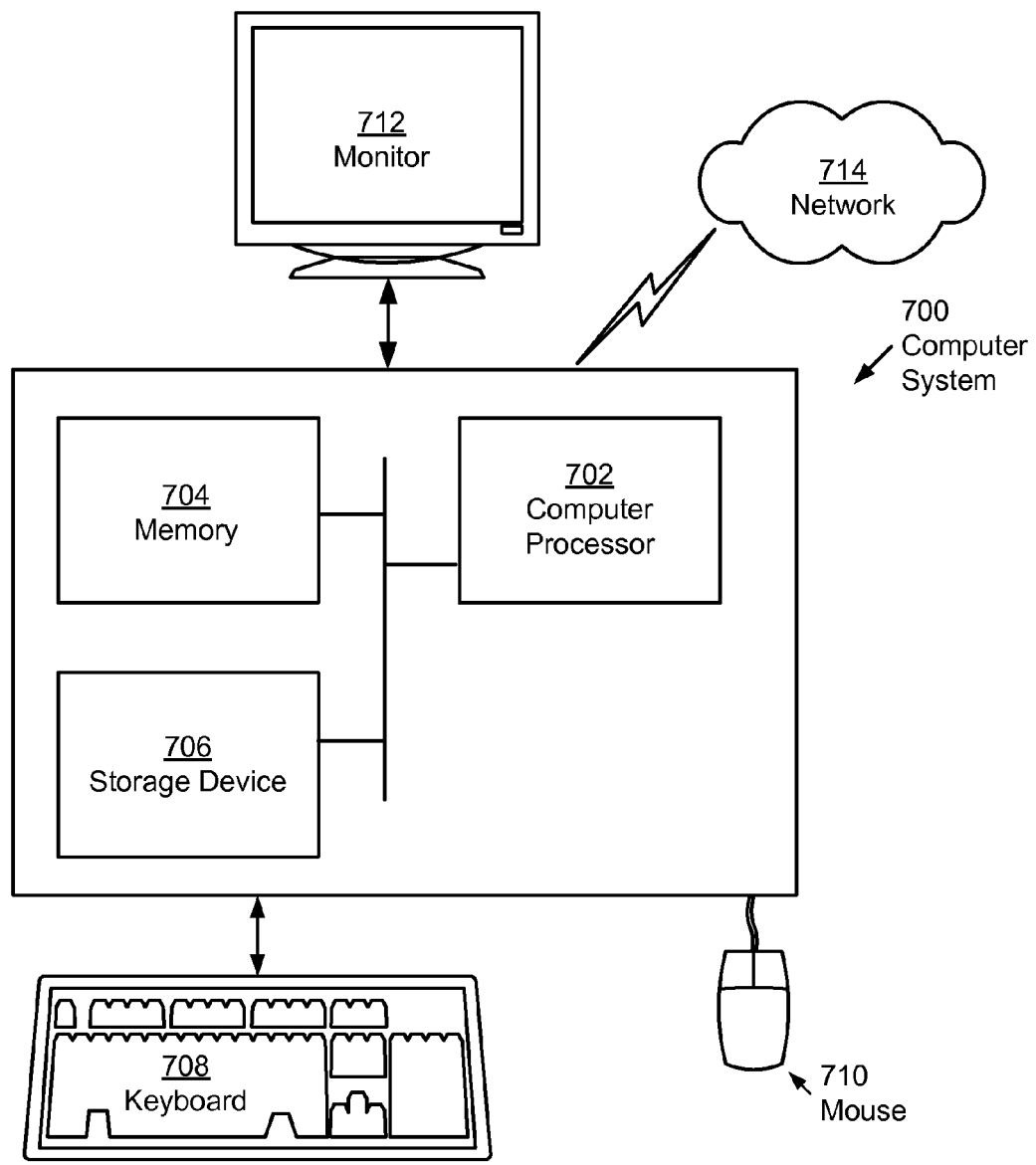
FIG. 7 shows a computer system in accordance with one embodiment of the invention.

Embodiments of the invention may be implemented on virtually any type of computer regardless of the platform being used. For example, as shown in FIG. 7, a computer system (700) includes one or more computer processor(s) (702) (e.g., hardware processor, integrated circuit, central processing unit, etc.), associated memory (704), a storage device (706) (e.g., a hard disk, an optical drive such as a compact disk drive or digital video disk (DVD) drive, a flash memory stick, etc.), and numerous other elements and functionalities typical of today's computers (not shown). The computer (700) may also include input means, such as a keyboard (708), a mouse (710), or a microphone (not shown). Further, the computer (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention (e.g., service front-end, service engine, profile database, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, or any other non-transitory computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating content, comprising:
   receiving, from a user, a plurality of data items comprising a plurality of restrictions of the content and a plurality of information associated with a business entity;
   analyzing the plurality of data items to identify a subject matter of the content;
   obtaining, based on the analysis, a content template corresponding to the subject matter, wherein the content template comprises a block of text comprising a plurality of blanks;
   accessing, based on the content template, a terminology library, comprising a plurality of words and phrases associated with the subject matter;
   analyzing the plurality of data items, the content template, and the terminology library to identify a required data item comprising a plurality of characteristics;
   generating a plurality of search terms corresponding to the plurality of characteristics of the required data item;
   performing an internet search, using the plurality of search terms, to obtain the required data item;
   analyzing the plurality of data items and the required data item to identify a plurality of additional terminology;
   identifying, based on the content template, a subset of the terminology library and a subset of the additional terminology;
   combining the content template, the subset of the terminology library, the subset of the additional terminology, and the plurality of information to generate raw content;
   obtaining unique content by modifying the raw content by rearranging text of the content and replacing a word of the content with a synonym of the word;
   displaying the unique content to the user;
   receiving, from the user, a plurality of edits to the unique content;
   applying the plurality of edits to the unique content to obtain completed content;
   analyzing the completed content to obtain a new content template and a new terminology library; and
   storing the new content template and the new terminology library in a data repository for future use.

2. The method of claim 1, further comprising:
   receiving, from the user, extant content, wherein the extant content is a block of text; and
   analyzing the extant content to obtain a plurality of additional data items.

3. The method of claim 2, further comprising modifying the extant content to obtain the content template.

4. The method of claim 1, further comprising:
   sending a request to the user to provide the required data item, wherein the request comprises the plurality of characteristics of the required data item; and
   receiving in response to the request, the required data item.

5. The method of claim 1, further comprising:
   receiving, from the user, access permission to a financial application of the user; and
   obtaining, from the financial application, a portion of the plurality of data items.

6. The method of claim 1, wherein at least one blank of the plurality of blanks is associated with a part of speech, wherein the required data item is a word to replace the blank with, and wherein at least one characteristic of the plurality of characteristics is the part of speech.

7. The method of claim 1, wherein at least one of the plurality of restrictions is a tone of the content, wherein the tone comprises a writing style of the content, and wherein the content template and the terminology library are selected based upon the tone.

8. A method for generating content, comprising:
   receiving, from a user, a plurality of data items comprising a plurality of restrictions of the content and a plurality of information associated with a business entity, wherein the plurality of restrictions include a restriction designating a preferred term;
   analyzing the plurality of data items to identify a subject matter of the content;
   obtaining, based on the analysis, a content template corresponding to the subject matter, wherein the content template comprises a block of text comprising a plurality of blanks;
   accessing, based on the content template, a terminology library, comprising a plurality of words and phrases associated with the subject matter;
   analyzing the plurality of data items, the content template, and the terminology library to identify a required data item comprising a plurality of characteristics;
   generating a plurality of search terms corresponding to the plurality of characteristics of the required data item;
   performing an internet search, using the plurality of search terms, to obtain the required data item;
   analyzing the plurality of data items and the required data item to identify a plurality of additional terminology;
   identifying, based on the content template, a subset of the terminology library and a subset of the additional terminology;
   combining the content template, the subset of the terminology library, the subset of the additional terminology, and the plurality of information to generate raw content; and
   obtaining unique content by modifying the raw content by rearranging text of the content and replacing a word of the content with a synonym of the word, wherein modifying the raw content includes:
      identifying synonyms of the preferred term in the raw content, and
      replacing the synonyms with the preferred term.

9. A content generation system, comprising:
   a computer processor;
   a data repository storing:
      a content template, wherein the content template comprises a block of text comprising a plurality of blanks; and
      a terminology library, wherein the terminology library comprises a plurality of words and phrases associated with a subject matter;
   a user interface receiving, from a user, a plurality of data items comprising a plurality of restrictions of content and a plurality of information associated with a business entity;
   a data acquisition module executing on the computer processor, accessing the data repository, and configured to:
      retrieve, from the data repository and based on an analysis of the plurality of data items, the content template corresponding to the subject matter;
      access, based on the content template, the terminology library stored in the data repository, to obtain the plurality of words and phrases associated with the subject matter; and perform an internet search, using a plurality of search terms generated by a data analysis module, to obtain a required data item;

the data analysis module executing on the computer processor and configured to:
analyze the plurality of data items, the content template, and the terminology library to identify the required data item, wherein the required data item comprises a plurality of characteristics;
generate the plurality of search terms corresponding to the plurality of characteristics of the required data item;
analyze the plurality of data items and the required data item to identify a plurality of additional terminology;
identify, based on the content template, a subset of the terminology library and a subset of the additional terminology;
analyze completed content to obtain a new content template and a new terminology library; and
store the new content template and the new terminology library in the data repository for future use;

a content generation module executing on the computer processor and configured to:
combine the content template, the subset of the terminology library, the subset of the additional terminology, and the plurality of information to generate raw content;
obtain unique content by modifying the raw content by rearranging text of the content and replacing a word of the content with a synonym of the word; and
apply a plurality of edits to the unique content to obtain the completed content;

wherein the user interface displays the unique content to the user, and receives, from the user, the plurality of edits to the unique content.

10. The content generation system of claim 9,
wherein the user interface is further configured to receive, from the user, extant content,
wherein the extant content is a block of text; and
wherein the data analysis module is further configured to analyze the extant content to obtain a plurality of additional data items.

11. The content generation system of claim 10 wherein the data acquisition module is further configured to modify the extant content to obtain the content template.

12. The content generation system of claim 9, wherein the user interface is further configured to:
display a request for the user to provide the required data item, wherein the request comprises the plurality of characteristics of the required data item;
receive, in response to the request, the required data item.

13. The content generation system of claim 9, wherein the data acquisition module is further configured to:
receive, from the user, access permission to a financial application of the user; and
obtain, from the financial application, a portion of the plurality of data items.

14. A non-transitory computer readable medium comprising executable instructions to:
receive, from a user, a plurality of data items comprising a plurality of restrictions of content and a plurality of information associated with a business entity;
analyze the plurality of data items to identify a subject matter of the content;
obtain, based on the analysis, a content template corresponding to the subject matter, wherein the content template comprises a block of text comprising a plurality of blanks;
access, based on the content template, a terminology library, comprising a plurality of words and phrases associated with the subject matter;
analyze the plurality of data items, the content template, and the terminology library to identify a required data item comprising a plurality of characteristics;
generate a plurality of search terms corresponding to the plurality of characteristics of the required data item;
perform an internet search, using the plurality of search terms, to obtain the required data item;
analyze the plurality of data items and the required data item to identify a plurality of additional terminology;
identify, based on the content template, a subset of the terminology library and a subset of the additional terminology;
combine the content template, the subset of the terminology library, the subset of the additional terminology, and the plurality of information to generate raw content;
obtain unique content by modifying the raw content by rearranging text of the content and replacing a word of the content with a synonym of the word;
display the unique content to the user;
receive, from the user, a plurality of edits to the unique content;
apply the plurality of edits to the unique content to obtain completed content;
analyze the completed content to obtain a new content template and a new terminology library; and
store the new content template and the new terminology library in a data repository for future use.

15. The non-transitory computer readable medium of claim 14, further comprising executable instructions to:
receive, from the user, extant content, wherein the extant content is a block of text; and
analyze the extant content to obtain a plurality of additional data items.

16. A non-transitory computer readable medium comprising executable instructions to:
receive, from a user, a plurality of data items comprising a plurality of restrictions of content and a plurality of information associated with a business entity, wherein the plurality of restrictions include a restriction designating a preferred term;
analyze the plurality of data items to identify a subject matter of the content;
obtain, based on the analysis, a content template corresponding to the subject matter, wherein the content template comprises a block of text comprising a plurality of blanks;
access, based on the content template, a terminology library, comprising a plurality of words and phrases associated with the subject matter;
analyze the plurality of data items, the content template, and the terminology library to identify a required data item comprising a plurality of characteristics;
generate a plurality of search terms corresponding to the plurality of characteristics of the required data item;
perform an internet search, using the plurality of search terms, to obtain the required data item;
analyze the plurality of data items and the required data item to identify a plurality of additional terminology;

identify, based on the content template, a subset of the terminology library and a subset of the additional terminology;

combine the content template, the subset of the terminology library, the subset of the additional terminology, and the plurality of information to generate raw content; and obtain unique content by modifying the raw content by rearranging text of the content and replacing a word of the content with a synonym of the word, wherein modifying the raw content includes:
   identifying synonyms of the preferred term in the raw content, and
   replacing the synonyms with the preferred term.

\* \* \* \* \*